United States Patent [19]
Snodgrass et al.

[11] Patent Number: 5,307,083
[45] Date of Patent: Apr. 26, 1994

[54] GRAYSCALE VIDEO CONVERSION SYSTEM

[75] Inventors: Chuck Snodgrass; Tom Stamm; Greg Blodgett, all of Boise, Id.

[73] Assignee: Micron Technology, Inc., Boise, Id.

[21] Appl. No.: 954,977

[22] Filed: Sep. 30, 1992

[51] Int. Cl.$^5$ .............................................. G09G 1/00
[52] U.S. Cl. ......................................... 345/1; 345/20; 345/147
[58] Field of Search ............... 340/717, 720, 721, 725, 340/744, 793, 794, 795, 796, 797; 345/1, 20, 147

[56] References Cited

U.S. PATENT DOCUMENTS

| | | | |
|---|---|---|---|
| 4,673,929 | 6/1987 | Nelson et al. | 340/744 |
| 4,684,935 | 8/1987 | Fujisaku et al. | 340/717 |
| 4,704,697 | 11/1987 | Kiremidjian et al. | 340/717 |
| 5,083,121 | 1/1992 | Nomura et al. | 340/717 |

FOREIGN PATENT DOCUMENTS 0120428  6/1985  Japan .................................. 340/717

OTHER PUBLICATIONS

*Silicon Valley Personal Computer Design Conference*, Conference Proceedings, "A Versatile, Low–Cost Bus Interface and Video Timing ASIC", by Snodgrass et al., Jul. 9–10, 1991.

Product Brochure entitled "Xceed MacroColor II, Xceed Macintosh Enhancement Products", by Micron Technology, Inc. (Jul. 15, 1991).

*Primary Examiner*—Richard Hjerpe
*Attorney, Agent, or Firm*—Wells, St. John, Roberts, Gregory & Matkin

[57] ABSTRACT

A multi-shade video conversion system is described to provide an enhanced "Macintosh SE/30" computer to display multi-shade images on the "SE/30" internal CRT. The conventional "SE/30" computer has a microprocessor motherboard, an expansion slot, and an internal CRT. An internal CRT amplifier apart from the motherboard normally receives and responds a binary video signal from the microprocessor motherboard to drive the internal CRT. The conversion system comprises a video frame buffer expansion board, a replacement analog CRT amplifier, and replacement cabling. The frame buffer expansion board generates an analog video signal which is selected provided to the replacement CRT amplifier, allowing multi-shade images to be displayed in the internal CRT. The frame buffer expansion board also has an auxiliary video output port to drive an external CRT. The replacement cabling supplies the motherboard binary video signal to the expansion board rather than to the replacement CRT amplifier. A primary video switch on the frame buffer expansion board provides the analog signal to the external CRT and the binary video signal to the internal CRT if the auxiliary CRT is connected to the auxiliary video output port. It provides the analog video signal to internal CRT if the auxiliary CRT is not connected to the auxiliary video output port. The frame buffer expansion board includes means for automatically sensing whether the external CRT is connected.

13 Claims, 5 Drawing Sheets

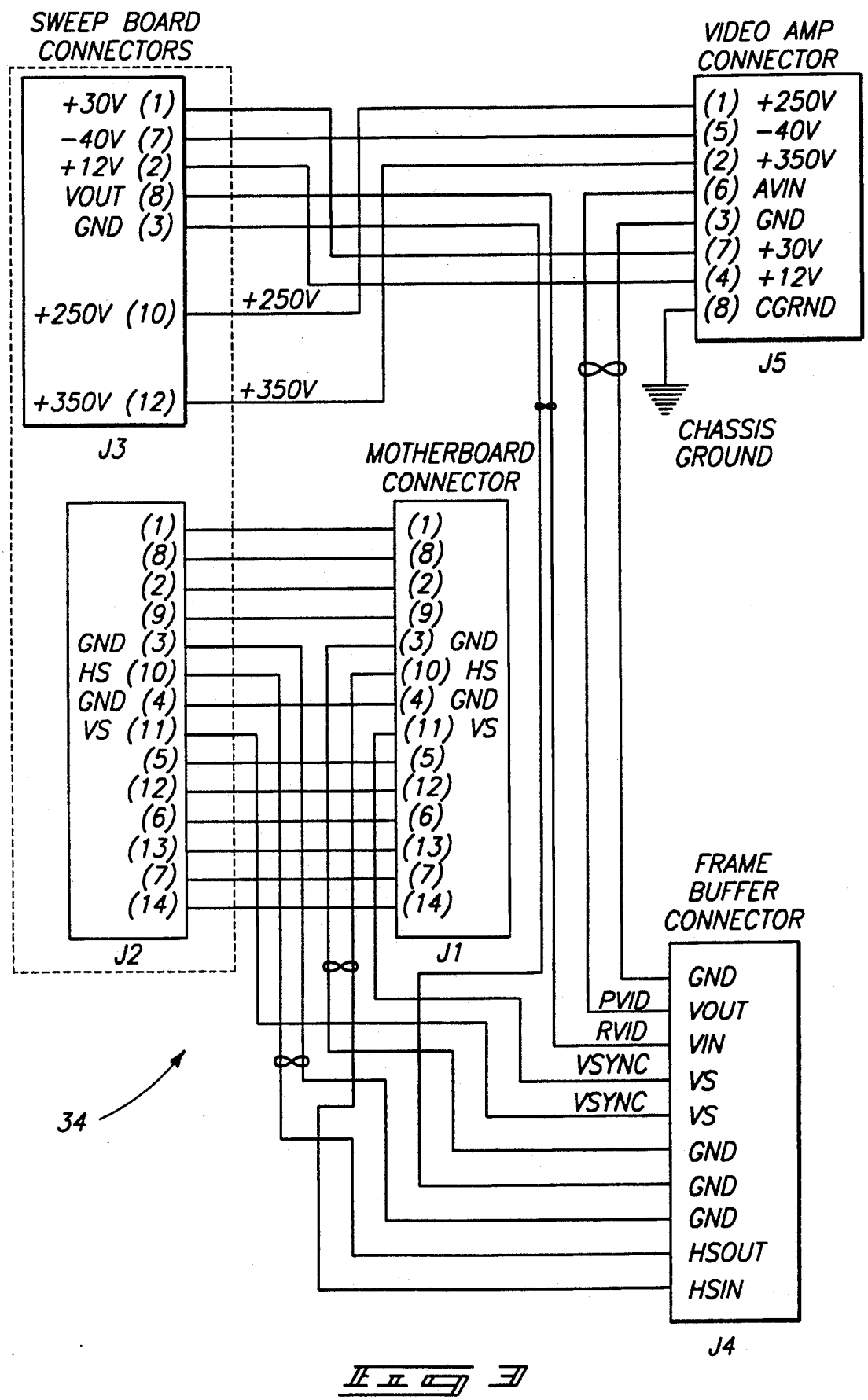

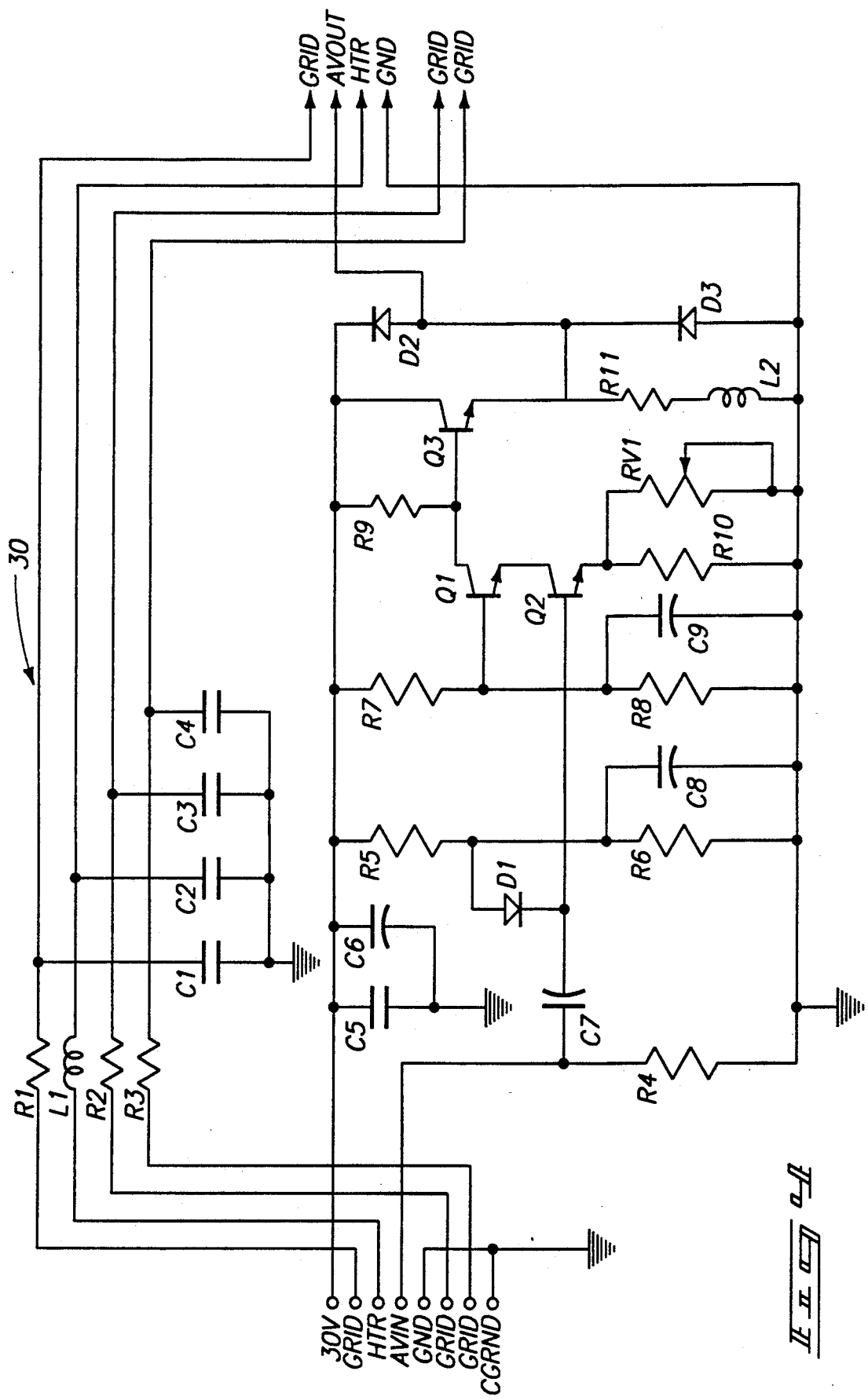

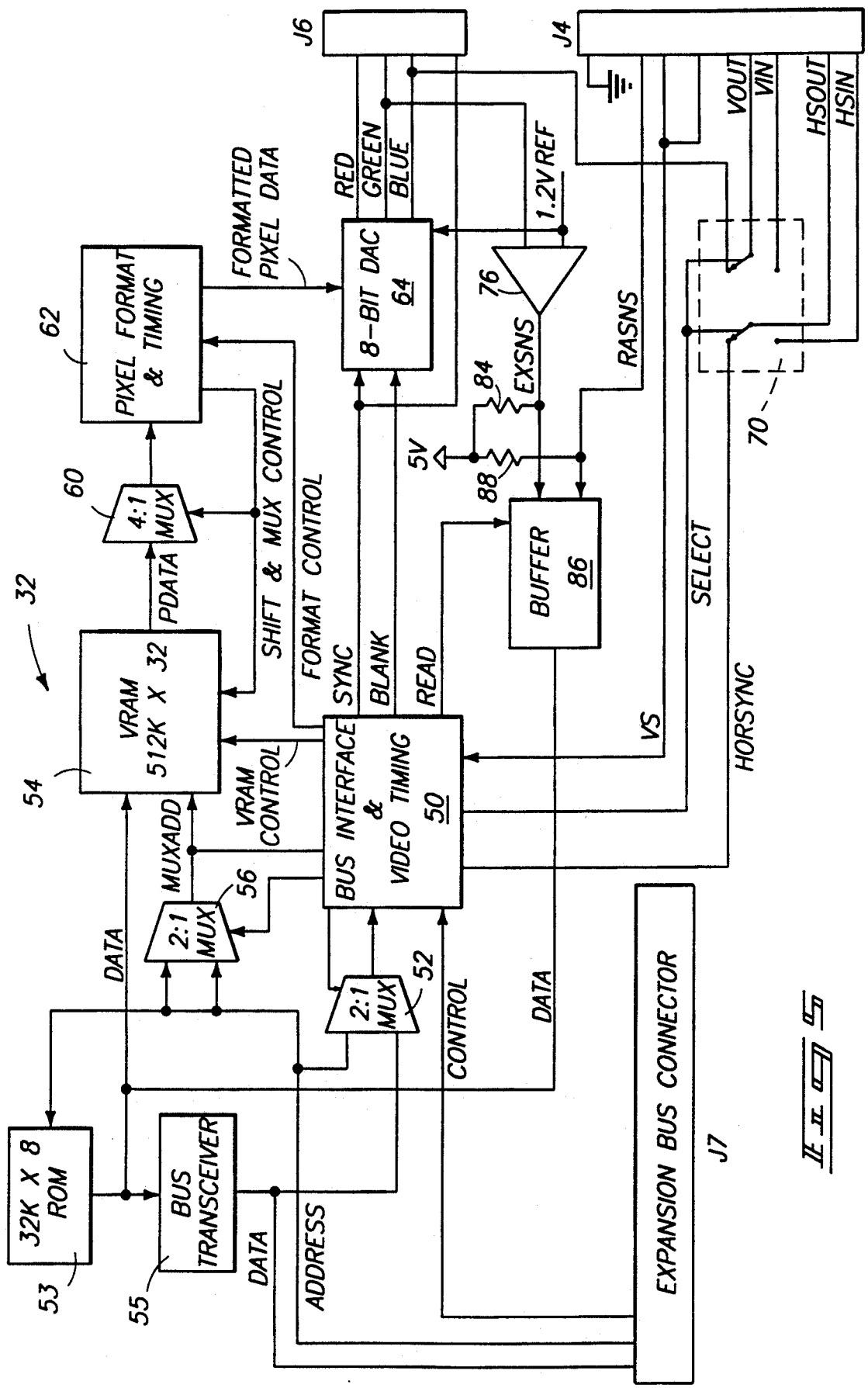

ic signal. Sweep board 16 also performs
GRAYSCALE VIDEO CONVERSION SYSTEM

TECHNICAL FIELD

This invention relates to video conversion systems or kits for adding grayscale video capability to computers having an integrated CRT driven by an internally-generated binary video signal.

BACKGROUND OF THE INVENTION

FIG. 1 shows in simplified block diagram a "Macintosh SE/30" personal computer, generally designated by the reference numeral 10. The "SE/30" is manufactured by Apple Computer, Inc., of Cupertino, Calif. It has a box-like computer housing (not shown) which generally contains everything necessary for computer operation except a keyboard and a printer. A microprocessor motherboard 12 integrates most of the necessary electronics, including floppy and hard disk drive interfaces, communications ports, and video circuits. Motherboard 12 also provides a single expansion slot 13.

The "SE/30" has an integrated, internal CRT (cathode ray tube) 14 mounted within the computer housing. CRT 14 is driven by the motherboard video circuits and additionally by a sweep board 16 and an internal CRT amplifier 18, both of which are separate from motherboard 12 but still contained within the computer housing.

Integrated on motherboard 12 is a two-state video driver 15 which generates a binary video signal BVID, a vertical synchronization signal VSYNC, and a horizontal synchronization signal HSYNC. The motherboard video signals are all binary, logic-level signals. Therefore, at any time each motherboard video signal has either a "high" voltage, typically approximately five volts, or a "low" voltage, typically approximately zero volts.

Sweep board 16 receives the motherboard video signals. It translates the logic-level VSYNC and HSYNC signals to the voltage levels required by CRT 14 and provides them as VSWEEP and HSWEEP to CRT 14. Sweep board 16 reduces the amplitude of motherboard binary video signal BVID from five volts to one volt, producing a reduced amplitude binary video signal RVID. Sweep board 16 also performs other functions related to driving CRT 14, such as producing grid and heater voltages.

CRT amplifier 18 normally receives the reduced amplitude binary video signal RVID, producing in response an amplified video signal AVID to drive the cathode of internal CRT 14. Amplified video signal AVID has a peak voltage of about thirty volts.

Because the video circuits of the "SE/30" computer are primarily integrated on its motherboard, rather than on a removable expansion board, upgrading to a multishade or color video display system is essentially prevented.

This invention resolves the need for an acceptable way of upgrading the "Macintosh SE/30" computer and similar computers to display multi-shade images, providing as well further new and innovative features which allow the "SE/30" computer to be used in modern and more complex applications than had previously been possible.

BRIEF DESCRIPTION OF THE DRAWINGS

A preferred embodiment of the invention is described below with reference to the accompanying drawings in which:

FIG. 3 is a schematic diagram of a replacement cable assembly in accordance with this invention;

FIG. 4 is a detailed schematic diagram of an analog replacement CRT amplifier in accordance with this invention; and FIG. 5 is a block diagram of a video frame buffer expansion board in accordance with this invention.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

Figure 1:
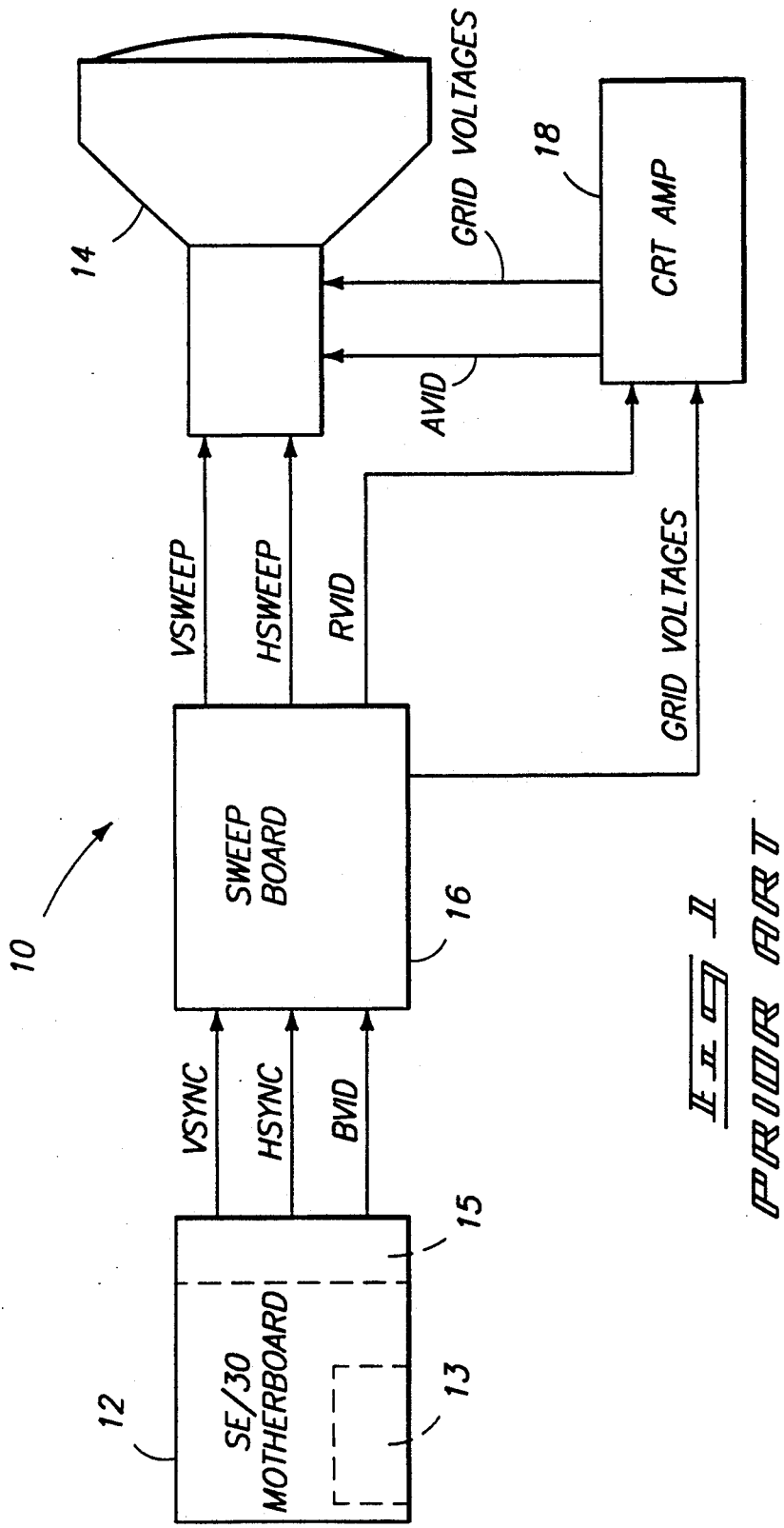
FIG. 1 is a simplified block diagram of a prior art "Macintosh SE/30" personal computer.
Figure 2:
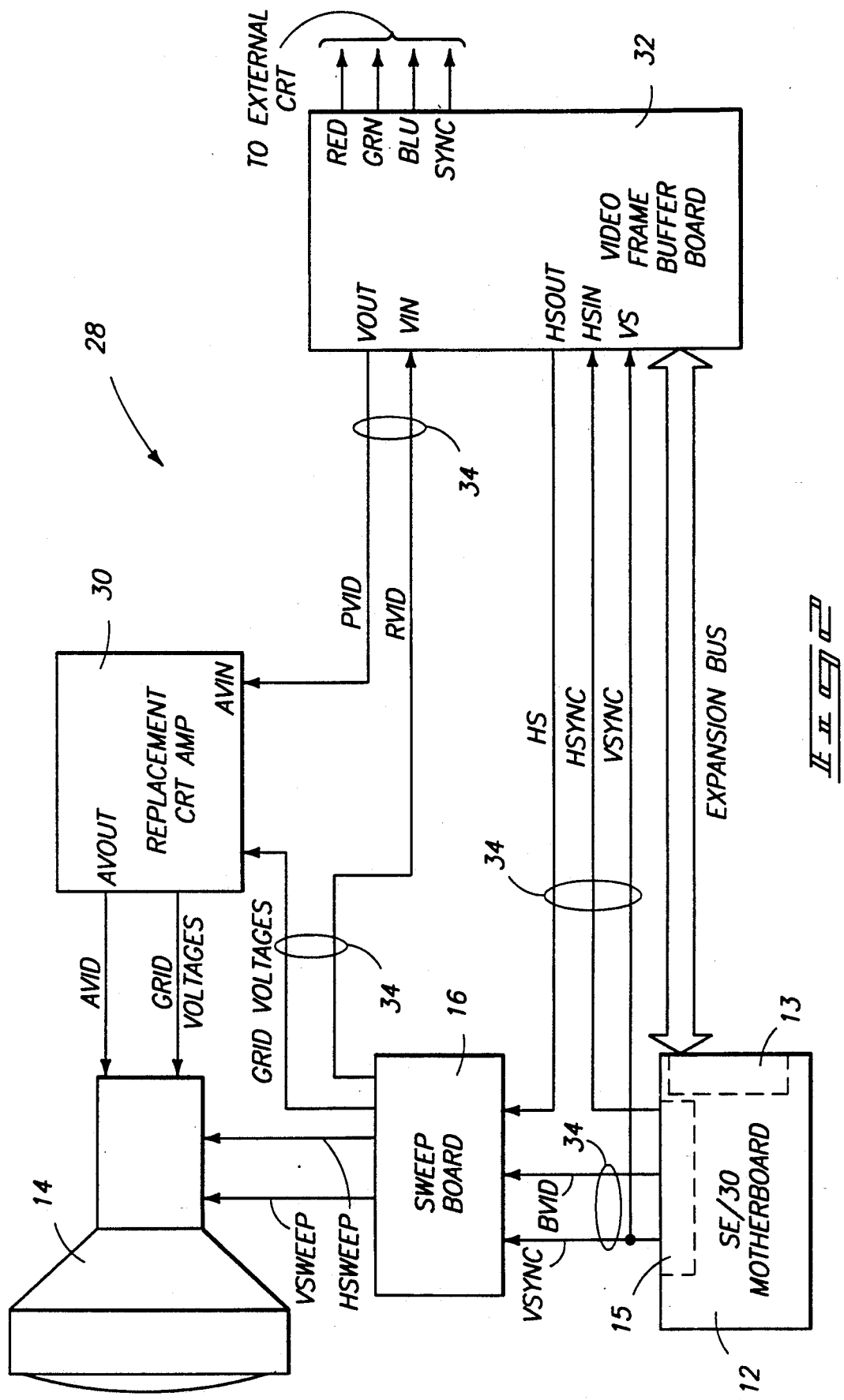
FIG. 2 is a simplified block diagram of a "Macintosh SE/30" personal computer and the components of a conversion system in accordance with this invention.

FIG. 2 shows a "Macintosh SE/30" personal computer with a replacement or conversion system for converting the "SE/30" into an enhanced computer having enhanced video characteristics to display multi-shade images on the computer's internal CRT. The enhanced "SE/30" computer with the installed conversion system is generally designated by the reference numeral 28. The enhanced computer comprises, similarly to computer 10 of FIG. 1, motherhood 12, internal CRT 14, and sweep board 16. Internal CRT amplifier 18 has been removed, however, and replaced with an analog replacement CRT amplifier 30. In addition, a video frame buffer expansion board 32 occupies the computer's expansion slot. A replacement cable 34 (schematically shown in FIG. 3) replaces the original computer video cabling to route the signals as schematically illustrated in FIG. 2 and as described below.

Video frame buffer expansion board 32 has a vertical synchronization input VS, a horizontal synchronization input HSIN, a horizontal synchronization output HSOUT, a binary video input VIN and a primary video output VOUT.

Vertical synchronization input VS of expansion board 32 and sweep board 16 receive the vertical synchronization signal VSYNC from motherhood 12. Frame buffer board 32 uses VSYNC to coordinate its video output to the video output of motherboard 12. Horizontal synchronization signal HSYNC from motherhood 12 is connected by replacement cable 34 directly to horizontal synchronization input HSIN of expansion board 32 instead of to sweep board 16. Frame buffer expansion board 32 produces a second horizontal synchronization signal HS at its horizontal synchronization output HSOUT. Replacement cable 34 connects HS to sweep board 16. Motherboard video signal BVID is connected to sweep board 16.

Reduced amplitude binary video signal RVID from sweep board 16 is connected to frame buffer binary video input VIN instead of to replacement CRT amplifier 30. Frame buffer board 32 generates a primary video signal PVID at its primary video output VOUT which replacement CRT amplifier 30 receives at its video input AVIN. Replacement CRT amplifier 30 produces an amplified video signal AVID at its video output AVOUT to drive the cathode of the computer's internal CRT 14. Internal CRT 14 receives VSWEEP and HSWEEP as described above from sweep board 16. Sweep board 16 and replacement CRT amplifier 30 also supply grid voltages to internal CRT 14.

Frame buffer expansion board 32 also has, in addition to its primary video output VOUT, an auxiliary video output port to drive an external, auxiliary CRT. The auxiliary video output port provides at least one analog video signal to the auxiliary CRT. The preferred embodiment includes analog video signals RED, GRN, and BLU and composite synchronization signal SYNC to drive a color auxiliary CRT. When using a monochrome auxiliary CRT, analog video signals RED and GRN are unused, with only analog video signal BLU being needed to drive the monochrome CRT's cathode.

Frame buffer expansion board 32 receives signals from microprocessor motherhood 12 through the computer's expansion slot and generates analog video signals RED, GRN, and BLU in response. In a basic form of operation, frame buffer expansion board 32 supplies one of the analog video signals to the primary video output port to form primary video signal PVID. Internal CRT 14 is therefore responsive to the analog video signal PVID through replacement CRT amplifier 30 to display multi-shade images.

More preferably, frame buffer expansion board 32 contains a primary video switch (described below with reference to FIG. 5) which selectively produces either the motherhood binary video signal BVID or the frame buffer analog video signal BLU at primary video output VOUT to form primary video signal PVID, the computer's internal CRT therefore being responsive to a selected one of said two video signals. In the preferred embodiment described here, frame buffer expansion board 32 produces the analog video signal BLU at the auxiliary video port and reduced amplitude binary video signal RVID at the primary video output VOUT if the auxiliary CRT is connected to the auxiliary video port. It produces the analog video signal BLU at primary video output VOUT to drive the computer's internal CRT if the auxiliary CRT is not connected to the auxiliary video port.

Frame buffer expansion board 32 is programmable from motherland 12 to select from the two video signals. It could alternatively be designed to respond to a mechanical switch. In the preferred embodiment, frame buffer expansion board 32 incudes external CRT sensing means for detecting the connection of an auxiliary CRT to the auxiliary video port. Software is provided to program and configure expansion board 32 accordingly.

The remaining description focuses on the physical implementation of the components described above. FIG. 3 schematically shows replacement cable 34 which replaces the original cabling between motherboard 12 and sweep board 16 and between sweep board 16 and CRT amplifier 18. Replacement cable 34 is required to implement the connections shown in FIG. 2. Connector pin member are shown in parenthesis. Corresponding signal names are also generally shown except for the direct connection between sweep board 16 and motherboard 12 which are the same connections provided by the original "SE/30" computer cabling.

Cable 34 is adapted to provide primary video signal PVID from primary video output VOUT to replacement CRT amplifier 30 so that internal CRT 14 is responsive to the primary video signal PVID rather than to reduced amplitude binary video signal RVID. Cable 34 supplies reduced amplitude binary video signal RVID to frame buffer expansion board 32 rather than to replacement CRT amplifier 30.

Replacement cable 34 includes a motherboard connector J1 which mates with motherhood 12, sweep board connectors J2 and J3 which mate sweep board 16, a frame buffer connector J4 which mates with frame buffer expansion board 32, and a CRT amplifier connector J5 which mates with replacement CRT amplifier 30. Cable 34 uses 18 gauge stranded wire except for the horizontal synchronization and video signal connections which are made with twisted wire pairs to reduce generation of and susceptibility to electromagnetic radiation and interference.

Video and horizontal synchronization terminals VS and HS of sweep board connector J2 are connected to VS and HSOUT of frame buffer connector J4. VS and HS of motherboard connector J1 are routed to VS and HSIN of frame buffer connector J4. VIN of frame buffer expansion board connector J4 receives reduced amplitude binary video signal RVID from VOUT of sweep board connector J3. AVIN of CRT amplifier connector J5 receives primary video signal PVID from VOUT of frame buffer connector J4.

In addition to the signals shown in FIG. 2 and described above, replacement cable 34 carries power supply voltages, CRT grid and heater voltages, and ground signals. For instance, grid and heater voltages of −40 volts, 12 volts, 250 volts, and 350 volts are provided from sweep board connector J3 to CRT amplifier connector J5. A thirty volt power supply voltage and ground are also connected from sweep board connector J3 to CRT amplifier connector J5. Other ground connections are as shown.

FIG. 4 shows in detail the circuit implementation of replacement CRT amplifier 30. Amplifier 30 replaces the internal CRT amplifier 18 of the "SE/30." It is adapted to receive a primary video signal from frame buffer expansion board 32 in the range of zero to one volt and to proportionally or linearly amplify the video signal to a peak value of approximately thirty volts to drive internal CRT 14 to display multiple shade images.

Replacement CRT amplifier 30 is a two-stage amplifier comprising an AC-coupled-input Cascode amplifier followed by an emitter-follower amplifier to buffer the amplified output signal. Amplifier 30 receives a positive reference voltage equal to about thirty volts and a negative reference voltage or ground from video sweep board 16. The positive reference voltage is filtered by the parallel connection of capacitors C5 and C6 to ground.

Bipolar transistor Q1 and Q2 form the input stage Cascode amplifier. Primary video signal PVID, connected to CRT amplifier video input AVIN, is terminated by a 300 ohm termination resistor R4 to ground. The base of Q2 is AC-coupled to amplifier video input AVIN through a coupling capacitor C7. An input biasing circuit, formed by diode D1, resistors R5 and R6, and capacitor C8, sets the black or DC level of the video output. The anode of D1 is biased to the desired DC level by voltage divider resistors R5 and R6. C8 is connected in parallel with R6. The cathode of D1 is connected to the base of Q2.

The base of transistor Q1 is biased by voltage divider resistors R7 and R8, with capacitor C9 being connected in parallel with R8. The emitter of Q1 is connected to the collector of Q2. The Cascode amplifier is further biased by resistor R9 connected between the collector of Q1 and the positive reference-voltage and by the parallel connection of resistors R10 and RV1 between the emitter of Q2 and ground. RV1 is a variable resistor to allow the Cascode amplifier to be adjusted or tuned.

Transistor Q3 forms the emitter-follower amplifier, with the amplifier input, the base of Q3, connected to the collector of Q1. Q3's collector is connected directly to the positive reference voltage. Q3's emitter is connected through a resistor R11 and a coil L2 to ground. Q3's emitter forms the output AVOUT of CRT amplifier 30. Diodes D2 and D3 are connected from AVOUT to the positive reference voltage and to ground, respectively, to limit the possible range of voltages at output AVOUT.

CRT amplifier board 32 also receives grid and heater voltages (250 V, −40 V, 350 V, and 12 V) from sweep board 16. These voltages are conditioned by resistors R1, R2, R3, RF choke L1, and capacitors C1, C2, C3, and C4 before being provided to CRT 14.

FIG. 5 shows frame buffer expansion board 32 in simplified block diagram. Frame buffer expansion board 32 is adapted to be mounted in computer expansion slot 13 of the "Macintosh SE/30" personal computer. Accordingly, frame buffer board 32 has an expansion bus connector J7 which mates with the computer's expansion slot connector. Frame buffer expansion board 32 is connected to computer expansion bus address lines, data lines, and other control lines through connector J7.

A bus interface and video timing (BIVT) circuit 50 includes bus interface circuits designed for connection to the "Macintosh SE/30" expansion bus, as well as video timing generation circuits. The BIVT bus interface circuits include address decoding for ROM, VRAM, DAC, internal mode registers, and external mode registers. BIVT circuit 50 receives address and data information from expansion bus connector J7 through a two-to-one multiplexor 52. Those interested in more detail regarding the implementation of bus and video interface circuits should refer to *Designing Cards and Drivers for the Macintosh Family*, 2nd ed. (Reading: Addison-Wesley, 1990), hereby incorporated by reference. General purpose BVIT chips are also available. For example, Texas Instruments of Dallas, Tex., manufactures two such chips under the part designations TMS34061 and TMS34020. For a description of an application-specific integrated circuit for the "Macintosh" family of personal computers, refer to *Silicon Valley Personal Computer Design Conference*, Conference Proceedings, "A Versatile, Low-Cost Bus Interface and Video Timing ASIC," by Snodgrass et. al, Jul. 9-10, 1991, hereby incorporated by reference.

Frame buffer expansion board 32 also has a 32K by 8 ROM 53 and a 512K by 32 video RAM (VRAM) 54. ROM 53 and VRAM 54 communicate with the computer expansion bus data lines through a bus transceiver 55. ROM 53 is also connected to the expansion bus address lines. VRAM 54 receives multiplexed row and column addresses from a two-to-one multiplexor 56 which in turn receives addresses from the computer expansion bus.

ROM 53 contains software drivers which the "SE/30" executes to initialize and control the circuits of frame buffer expansion board 32 and replacement CRT amplifier 30. VRAM 54 is formed by commonly available dual-port RAMs such as part number MT42C8128 available from Micron Technology, Inc., of Boise, Id.

VRAM 54 is loaded through the computer expansion bus with data corresponding to a desired display image. The data is shifted out through the VRAM's serial port to a four-to-one multiplexor 60. Multiplexor 60 reduces the VRAM data from thirty two bits wide to eight bits wide. A pixel format and timing circuit 62 receives the reduced width data from multiplexor 60. Format and timing circuit 62 receives control signals from BVIT circuit 50 and generates timing and control signals for VRAM 54 and multiplexor 60. Format and timing circuit 62 receives pixel data from multiplexor 60, eight bits at a time, and shifts the pixel data out in appropriate widths at appropriately timed intervals according to various "Macintosh" video operational modes. The formatted pixel data is supplied to an 8-bit digital-to-analog converter circuit (DAC) 64.

DAC 64 generates three analog video signals, BLU, GRN, and RED. DAC 64 receives, besides the formatted pixel data from format and timing circuit 62, a composite synchronization signal SYNC and a composite blanking signal BLANK from BVIT circuit 50. The analog video signals BLU, GRN, and RED, along with composite synchronization signal SYNC, form the frame buffer board's auxiliary video output port to which an external or auxiliary color or monochrome CRT can be connected. In the alternative, analog video signal BLU can be provided to the primary video port to drive the computer's internal CRT.

A primary video switch 70 multiplexes video input VIN (connected to reduced amplitude binary video signal RVID) and analog video signal BLU onto the single primary video output line VOUT. Video switch 70 also multiplexes a horizontal synchronization signal HORSYNC, generated by BVIT circuit 50, and horizontal synchronization signal HSIN (connected to HSYNC from motherboard 12) onto a single horizontal synchronization output line HSOUT. Video switch 70 comprises two analog switches which are controlled by a control line SELECT from BVIT circuit 50.

Frame buffer expansion board 32 also comprises an auxiliary CRT sensing circuit or means which detects or tests for the connection of an auxiliary CRT to the frame buffer board's auxiliary video output port. The sensing circuit comprises an analog voltage comparator 76 having a reference input connected to an intermediate 1.2 volt reference and a test input connected to one of analog video signals RED, BLU, or GRN.

The sensing circuit relies on the standard 75 ohm termination of the analog video signals RED, BLU, and GRN at each of their ends—a source termination at the frame buffer end and a load termination at the CRT end—and that DAC 64 actually produces a fixed current rather than a fixed voltage into the terminations. To determine whether an external CRT is connected, VRAM 54 is filled with appropriate pixel data such that DAC 64 in response will produce a 0.7 volt signal to a connected and properly terminated external CRT. This voltage will not activate comparator 76. If there is no connected external CRT, DAC 64 will produce the same current. But because of the missing load termination when the auxiliary CRT is not connected, DAC 64 will encounter only a single 75 ohm source termination rather than parallel 75 ohm terminations. Accordingly, the fixed current will encounter a higher termination resistance, producing a correspondingly higher voltage above the 1.2 volt threshold of comparator 76.

Comparator 76 produces an external CRT sense line EXSNS which is biased high by a resistor 84 and received by a buffer 86. The "SE/30" computer can read the results of the comparison through buffer 86 and configure frame buffer expansion board 32 accordingly. It is important, however, to read the output of comparator 76 only during actual trace periods, rather than "blanked" periods. To accomplish this timing, it is necessary to wait for the composite blank signal BLANK to go on and then off before reading the output of comparator 76. This sequence signals the beginning of a horizontal trace period.

A replacement amplifier sense line RASNS is also received by buffer 86 to allow the computer to determine whether the original CRT amplifier has been replaced by replacement CRT video amplifier 30. RASNS is biased high by a resistor 88 and connected by cable 34 to a ground terminal of replacement CRT video amplifier 30. The corresponding terminal of the original CRT amplifier is unused or floating so that RASNS is pulled low only when replacement CRT amplifier 30 is installed. Knowing whether replacement CRT video amplifier 30 has been installed allows routing analog video signal BLU to the internal CRT 14 only when the replacement analog CRT video amplifier has been installed.

Primary video switch 70 is controlled, in response to external CRT sense line EXSNS and replacement amplifier sense line RASNS, to produce the reduced amplitude binary video signal RVID at primary video output VOUT if the auxiliary CRT is connected to the auxiliary video output port or if replacement CRT amplifier 30 is not installed. Otherwise, primary video switch 70 produces analog video signal BLU at primary video output VOUT.

The conversion system described above adds multi-shade display capability to the internal CRT of the "Macintosh SE/30" computer in a convenient and inexpensive manner. The analog capability of the "SE/30" built-in CRT is utilized to avoid the expense of an external CRT. At the same time, however, the conversion systems provides for connection of an external CRT while allowing concurrent operation of the computer's internal CRT.

In compliance with the patent statute, the invention has been described in language more or less specific as to structural and methodical features. It is to be understood, however, that the invention is not limited to the specific features described, since the means disclosed comprise preferred forms of putting the invention into effect. The invention is, therefore, claimed in any of its forms or modifications within the proper scope of the appended claims appropriately interpreted in accordance with the doctrine of equivalents.

We claim:

1. A multi-shade video conversion system for adding to a computer to display multi-shade images, the computer having a microprocessor motherboard, an expansion slot, and an internal CRT; the microprocessor motherboard having integrated thereon a two-state video driver which generates a binary video signal; the computer also having an internal CRT amplifier apart from the motherboard which normally receives and responds to the binary video signal to drive a cathode of the internal CRT, the conversion system comprising:

a video frame buffer expansion board adapted to mount in the computer expansion slot; wherein the expansion board receives signals from the microcomputer motherboard through the expansion slot and in response thereto generates an analog video signal; and wherein the expansion board has a primary video output at which a primary video signal is provided;

an analog replacement CRT amplifier adapted to replace the computer's internal CRT amplifier and to drive the internal CRT to display multiple shades on the internal CRT;

replacement cabling adapted to communicate the primary video signal from the expansion board primary video output to the replacement CRT amplifier to make the computer's internal CRT responsive to the primary video signal; and wherein the expansion board has a primary video switch which selectably produces either the binary video signal or the analog video signal at the primary video output to form the primary video signal and to drive the computer's internal CRT with a selected one of said two video signals.

2. The conversion system of claim 1 wherein the replacement cabling is further adapted to supply the binary video signal to the expansion board rather than to the replacement CRT amplifier.

3. The conversion system of claim 1 wherein the expansion board supplies the analog video signal to the primary video output to form the primary video signal and to drive the computer's internal CRT to display multi-shade images.

4. The conversion system of claim 1, the frame buffer expansion board further comprising an auxiliary video output port, wherein the frame buffer expansion board provides the analog video signal at the auxiliary video output port to drive an external auxiliary CRT.

5. The conversion system of claim 1, the frame buffer expansion board comprising an auxiliary color video port, wherein the frame buffer expansion board provides the analog video signal at the auxiliary color video port to drive an external auxiliary color CRT.

6. A multi-shade video conversion system for adding to a computer to display multi-shade images, the computer having a microprocessor motherboard, an expansion slot, and an internal CRT; the microprocessor motherboard having integrated thereon a two-state video driver which generates a binary video signal; the computer also having an internal CRT amplifier apart from the motherboard which normally receives and responds to the binary video signal to drive a cathode of the internal CRT, the conversion system comprising:

a video frame buffer expansion board adapted to mount in the computer expansion slot; wherein the expansion board receives signals from the microprocessor motherboard through the expansion slot and in response thereto generates an analog video signal; and wherein the expansion board has a primary video output at which a primary video signal is provided;

an analog replacement CRT amplifier adapted to replace the computer's internal CRT amplifier and to drive the internal CRT to display multiple shades on the internal CRT; and replacement cabling adapted to communicate the primary video signal from the expansion board primary video output to the replacement CRT amplifier to make the computer's internal CRT responsive to the primary video signal;

the frame buffer expansion board comprising an auxiliary color video port, wherein the frame buffer expansion board provides the analog video signal at the auxiliary color video port to drive an external auxiliary color CRT;

wherein the expansion board further comprises a primary video switch which (a) produces the analog video signal at the auxiliary video output port and the binary video signal at the primary video output if the auxiliary CRT is connected to the auxiliary video output port; and (b) produces the analog video signal at the primary video output to drive the computer's internal CRT if the auxiliary CRT is not connected to the auxiliary video output port.

7. A multi-shade video conversion system for adding to a computer to display multi-shade images, the computer having a microprocessor motherboard, an expansion slot, and an internal CRT; the microprocessor motherboard having integrated thereon a two-state video driver which generates a binary video signal; the computer also having an internal CRT amplifier apart from the motherboard which normally receives and responds to the binary video signal to drive a cathode of the internal CRT, the conversion system comprising:

a video frame buffer expansion board adapted to mount in the computer expansion slot; wherein the expansion board receives signals from the microprocessor motherboard through the expansion slot and in response thereto generates an analog video signal; and wherein the expansion board has a primary video output at which a primary video signal is provided;

an analog replacement CRT amplifier adapted to replace the computer's internal CRT amplifier and to drive the internal CRT to display multiple shades on the internal CRT; and replacement cabling adapted to communicate the primary video signal from the expansion board primary video output to the replacement CRT amplifier to make the computer's internal CRT responsive to the primary video signal:

the frame buffer expansion board comprising an auxiliary color video port, wherein the frame buffer expansion board provides the analog video signal at the auxiliary color video port to drive an external auxiliary color CRT;

wherein the expansion board further comprises:

CRT sensing means for detecting the connection of the auxiliary CRT to the auxiliary video output port; and a primary video switch which produces the analog video signal at the auxiliary video output port and the binary video signal at the primary video output if the auxiliary CRT is connected to the auxiliary video output port; and which produces the analog video signal at the primary video output to drive the computer's internal CRT if the auxiliary CRT is not connected to the auxiliary video output port.

8. The conversion system of claim 7 wherein the CRT sensing means further comprises a voltage comparator having a reference input connected to an intermediate reference voltage and a test input connected to an analog video signal of the auxiliary video output port.

9. A multi-shade video conversion system for adding to a computer to display multi-shade images, the computer having a microprocessor motherboard, an expansion slot, and an internal CRT; the microprocessor motherboard having integrated thereon a two-state video driver which generates a binary video signal; the computer also having an internal CRT amplifier apart from the motherboard which normally receives and responds to the binary video signal to drive a cathode of the internal CRT, the conversion system comprising:

a video frame buffer expansion board adapted to occupy the computer expansion slot; wherein the expansion board receives signals from the microprocessor motherboard through the expansion slot and generates an analog video signal in response; and wherein the expansion board has a primary video output at which a primary video signal is provided;

an analog replacement CRT amplifier adapted to replace the computer's internal CRT amplifier and to drive the cathode of the internal CRT to display multiple shades on the internal CRT;

replacement cabling adapted to supply the binary video signal to the expansion board rather than to the replacement CRT amplifier; wherein the cabling is adapted to provide the primary video signal from the expansion board primary video output to the replacement CRT amplifier;

an auxiliary video output port on the expansion board to drive an optional external auxiliary CRT; and a primary video switch which produces the analog video signal at the auxiliary video output port and the binary video signal at the primary video output if the auxiliary CRT is connected to the auxiliary video output port; and which produces the analog video signal at the primary video output if the auxiliary CRT is not connected to the auxiliary video output port.

10. The conversion system of claim 9 wherein the expansion board further comprises CRT sensing means for detecting the connection of the auxiliary CRT to the auxiliary video output port.

11. The conversion system of claim 10 wherein the CRT sensing means further comprises a voltage comparator having a reference input connected to an intermediate reference voltage and a test input connected to an analog video signal of the auxiliary video output port.

12. In a computer having an internal CRT and a microprocessor motherboard which generates a binary video signal, wherein the binary video signal is normally supplied to the computer's internal CRT, a method of displaying multi-shade video images on the computer's internal CRT comprising the steps of:

supplying the binary video signal to a frame buffer expansion board rather than to the computer's internal CRT, wherein the frame buffer expansion board has a primary video output for supplying a primary video signal to the computer's internal CRT;

generating an analog video signal, the analog video signal being capable of driving a CRT to display multi-shade video images;

testing for the connection of an external CRT to an auxiliary video output port of the frame buffer expansion board;

producing the binary video signal at the primary video output and the analog video signal at the auxiliary video output port if an auxiliary CRT is connected to the auxiliary video output port; and producing the analog video signal at the primary video output if the auxiliary CRT is not connected to the auxiliary video output port.

13. The method of claim 12 wherein the step of testing comprises the steps of:
producing a predetermined current into the auxiliary video output port's termination resistance;
comparing the resulting voltage at the auxiliary video output port to a reference voltage;
concluding a CRT is present if the resulting voltage is below the reference voltage.

* * * * *